US009110934B2

(12) United States Patent
Bailey et al.

(10) Patent No.: US 9,110,934 B2
(45) Date of Patent: Aug. 18, 2015

(54) SYSTEM AND METHOD FOR DELIVERING AN INTEGRATED SERVER ADMINISTRATION PLATFORM

(75) Inventors: John H. Bailey, Durham, NC (US); Walter Canis, St. Louis, MO (US); Kenneth David Christiance, Apex, NC (US); Shang Qing Guo, Ossining, NY (US); Joseph L. Hellerstein, Ossining, NY (US); Patrick B. Heywood, Louisville, CO (US); Jonathan Lenchner, North Salem, NY (US); Rajan Ravirajan, Apex, NC (US); Michael John Spisak, East Northport, NY (US)

(73) Assignee: International Business Machines Corporation, Armonk, NY (US)

( * ) Notice: Subject to any disclaimer, the term of this patent is extended or adjusted under 35 U.S.C. 154(b) by 2938 days.

(21) Appl. No.: 11/421,780

(22) Filed: Jun. 2, 2006

(65) Prior Publication Data
US 2007/0282942 A1   Dec. 6, 2007

(51) Int. Cl.
*G06F 15/16* (2006.01)
*G06F 17/30* (2006.01)

(52) U.S. Cl.
CPC .............................. *G06F 17/30289* (2013.01)

(58) Field of Classification Search
USPC .......................... 709/226; 715/734–737, 740
See application file for complete search history.

(56) References Cited

U.S. PATENT DOCUMENTS

| 4,835,372 | A |   | 5/1989 | Gombrich et al. |
| 5,049,873 | A | * | 9/1991 | Robins et al. ................. 370/254 |
| 5,504,921 | A | * | 4/1996 | Dev et al. ...................... 709/223 |
| 5,634,009 | A | * | 5/1997 | Iddon et al. ................... 709/223 |
| 5,724,262 | A |   | 3/1998 | Ghahramani |
| 5,734,837 | A |   | 3/1998 | Flores et al. |
| 5,765,138 | A |   | 6/1998 | Aycock et al. |
| 5,774,661 | A |   | 6/1998 | Chatterjee et al. |

(Continued)

FOREIGN PATENT DOCUMENTS

WO     2007143516    12/2007

OTHER PUBLICATIONS zur Muehlen, Michael. "Resource Modeling in Workflow Applications", 1999, 17 pages.*

(Continued)

*Primary Examiner* — Suraj Joshi
(74) *Attorney, Agent, or Firm* — Cahn & Samuels, LLP (57) ABSTRACT

The invention enables server administrators (SAs) to improve their productivity and performance. With the methods and systems described herein, the prior art needed to search for appropriate tools for appropriate tasks is minimized and/or eliminated. Easier scripting and automation that does not require implementation across tools is provided. A consistent logical place is provided for all resources to be used. Standardization of tools enables improvements in service quality. Tools may be provided using one unambiguous authoritative data model, which eliminates data inconsistencies between sources. With the invention, updates to service delivery clients may be delivered more quickly. The invention also reduces costs for developing, deploying, and maintaining a tightly integrated service delivery client. Integration may be provided from the bottom up rather than after the fact. With the invention, common base objects are provided for events, problem and change records, and other system administration artifacts.

18 Claims, 9 Drawing Sheets

One Integrated Administrative Desktop (behind the scenes Tools Integration). No separately named tools visible.

Integrated Admin Desktop

(56) References Cited

U.S. PATENT DOCUMENTS

| | | | |
|---|---|---|---|
| 5,826,239 A | 10/1998 | Du et al. | |
| 5,850,535 A | 12/1998 | Maystrovsky et al. | |
| 5,870,545 A | 2/1999 | Davis et al. | |
| 5,884,302 A | 3/1999 | Ho | |
| 5,907,488 A | 5/1999 | Arimoto et al. | |
| 5,937,388 A | 8/1999 | Davis et al. | |
| 6,049,776 A | 4/2000 | Donnelly et al. | |
| 6,131,085 A | 10/2000 | Rossides | |
| 6,249,769 B1 | 6/2001 | Ruffin et al. | |
| 6,259,448 B1* | 7/2001 | McNally et al. | 715/733 |
| 6,263,335 B1 | 7/2001 | Paik et al. | |
| 6,308,163 B1* | 10/2001 | Du et al. | 705/8 |
| 6,308,208 B1* | 10/2001 | Jung et al. | 709/224 |
| 6,339,838 B1 | 1/2002 | Weinman, Jr. | |
| 6,363,384 B1 | 3/2002 | Cookmeyer, II et al. | |
| 6,453,269 B1 | 9/2002 | Quernemoen | |
| 6,473,794 B1 | 10/2002 | Guheen et al. | |
| 6,496,209 B2 | 12/2002 | Horii | |
| 6,523,027 B1 | 2/2003 | Underwood | |
| 6,526,387 B1 | 2/2003 | Ruffin et al. | |
| 6,526,392 B1* | 2/2003 | Dietrich et al. | 705/400 |
| 6,526,404 B1 | 2/2003 | Slater et al. | |
| 6,618,730 B1 | 9/2003 | Poulter et al. | |
| 6,675,149 B1 | 1/2004 | Ruffin et al. | |
| 6,738,736 B1 | 5/2004 | Bond | |
| 6,763,380 B1* | 7/2004 | Mayton et al. | 709/224 |
| 6,789,101 B2* | 9/2004 | Clarke et al. | 709/202 |
| 6,810,383 B1 | 10/2004 | Loveland | |
| 6,865,370 B2 | 3/2005 | Ho et al. | |
| 6,879,685 B1 | 4/2005 | Peterson et al. | |
| 6,907,549 B2 | 6/2005 | Davis et al. | |
| 6,970,803 B1 | 11/2005 | Aerdts et al. | |
| 6,988,088 B1 | 1/2006 | Miikkulainen et al. | |
| 6,988,132 B2 | 1/2006 | Horvitz | |
| 7,010,593 B2 | 3/2006 | Raymond | |
| 7,039,606 B2 | 5/2006 | Hoffman et al. | |
| 7,089,529 B2* | 8/2006 | Sweitzer et al. | 717/104 |
| 7,114,146 B2 | 9/2006 | Zhang et al. | |
| 7,177,774 B1 | 2/2007 | Brown et al. | |
| 7,236,966 B1 | 6/2007 | Jackson et al. | |
| 7,260,535 B2 | 8/2007 | Galanes et al. | |
| 7,293,238 B1 | 11/2007 | Brook et al. | |
| 7,315,826 B1 | 1/2008 | Guheen et al. | |
| 7,364,067 B2 | 4/2008 | Steusloff et al. | |
| 7,403,948 B2 | 7/2008 | Ghoneimy et al. | |
| 7,412,502 B2 | 8/2008 | Fearn et al. | |
| 7,467,198 B2 | 12/2008 | Goodman et al. | |
| 7,472,037 B2 | 12/2008 | Brown et al. | |
| 7,490,145 B2* | 2/2009 | Sylor et al. | 709/224 |
| 7,562,143 B2 | 7/2009 | Fellenstein et al. | |
| 7,580,906 B2 | 8/2009 | Faihe | |
| 7,599,308 B2* | 10/2009 | Laver et al. | 370/252 |
| 7,707,015 B2 | 4/2010 | Lubrecht et al. | |
| 7,802,144 B2* | 9/2010 | Vinberg et al. | 714/37 |
| 7,818,418 B2* | 10/2010 | Bansal et al. | 709/224 |
| 2001/0047270 A1 | 11/2001 | Gusick et al. | |
| 2002/0019837 A1 | 2/2002 | Balnaves | |
| 2002/0055849 A1 | 5/2002 | Georgakopoulos et al. | |
| 2002/0091736 A1 | 7/2002 | Wall | |
| 2002/0099578 A1 | 7/2002 | Eicher et al. | |
| 2002/0111823 A1 | 8/2002 | Heptner | |
| 2002/0140725 A1 | 10/2002 | Horii | |
| 2002/0147809 A1 | 10/2002 | Vinberg | |
| 2002/0161875 A1 | 10/2002 | Raymond | |
| 2002/0169649 A1 | 11/2002 | Lineberry | |
| 2002/0186238 A1 | 12/2002 | Sylor et al. | |
| 2003/0004746 A1 | 1/2003 | Kheirolomoom et al. | |
| 2003/0018629 A1 | 1/2003 | Namba | |
| 2003/0018771 A1 | 1/2003 | Vinberg | |
| 2003/0033402 A1 | 2/2003 | Battat et al. | |
| 2003/0065764 A1 | 4/2003 | Capers et al. | |
| 2003/0065805 A1 | 4/2003 | Barnes | |
| 2003/0097286 A1 | 5/2003 | Skeen | |
| 2003/0101086 A1 | 5/2003 | San Miguel | |
| 2003/0154406 A1 | 8/2003 | Honarvar et al. | |
| 2003/0172145 A1 | 9/2003 | Nguyen | |
| 2003/0187719 A1 | 10/2003 | Brocklebank | |
| 2003/0225747 A1 | 12/2003 | Brown et al. | |
| 2004/0024627 A1 | 2/2004 | Keener | |
| 2004/0158568 A1 | 8/2004 | Colle et al. | |
| 2004/0172466 A1 | 9/2004 | Douglas et al. | |
| 2004/0181435 A9 | 9/2004 | Snell et al. | |
| 2004/0186757 A1 | 9/2004 | Starkey | |
| 2004/0186758 A1 | 9/2004 | Halac et al. | |
| 2004/0199417 A1 | 10/2004 | Baxter et al. | |
| 2005/0027585 A1 | 2/2005 | Wodtke et al. | |
| 2005/0027845 A1 | 2/2005 | Secor et al. | |
| 2005/0066026 A1 | 3/2005 | Chen et al. | |
| 2005/0091269 A1 | 4/2005 | Gerber et al. | |
| 2005/0114306 A1 | 5/2005 | Shu et al. | |
| 2005/0114829 A1 | 5/2005 | Robin et al. | |
| 2005/0136946 A1 | 6/2005 | Trossen | |
| 2005/0138631 A1 | 6/2005 | Bellotti et al. | |
| 2005/0159969 A1 | 7/2005 | Sheppard | |
| 2005/0187929 A1 | 8/2005 | Staggs | |
| 2005/0203917 A1 | 9/2005 | Freeberg et al. | |
| 2005/0223299 A1* | 10/2005 | Childress et al. | 714/47 |
| 2005/0223392 A1 | 10/2005 | Cox et al. | |
| 2005/0254775 A1 | 11/2005 | Hamilton et al. | |
| 2006/0067252 A1 | 3/2006 | John et al. | |
| 2006/0069607 A1 | 3/2006 | Linder | |
| 2006/0112036 A1 | 5/2006 | Zhang et al. | |
| 2006/0112050 A1 | 5/2006 | Miikkulainen et al. | |
| 2006/0129906 A1 | 6/2006 | Wall | |
| 2006/0168168 A1 | 7/2006 | Xia et al. | |
| 2006/0178913 A1 | 8/2006 | Lara et al. | |
| 2006/0184410 A1 | 8/2006 | Ramamurthy et al. | |
| 2006/0190482 A1 | 8/2006 | Kishan et al. | |
| 2006/0224569 A1 | 10/2006 | DeSanto et al. | |
| 2006/0224580 A1 | 10/2006 | Quiroga et al. | |
| 2006/0235690 A1 | 10/2006 | Tomasic et al. | |
| 2006/0282302 A1 | 12/2006 | Hussain | |
| 2006/0287890 A1 | 12/2006 | Stead et al. | |
| 2007/0043524 A1 | 2/2007 | Brown et al. | |
| 2007/0055558 A1 | 3/2007 | Shanahan et al. | |
| 2007/0073576 A1 | 3/2007 | Connors et al. | |
| 2007/0073651 A1 | 3/2007 | Imielinski | |
| 2007/0083419 A1 | 4/2007 | Baxter et al. | |
| 2007/0118514 A1 | 5/2007 | Mariappan | |
| 2007/0168225 A1 | 7/2007 | Haider et al. | |
| 2007/0219958 A1 | 9/2007 | Park et al. | |
| 2007/0234282 A1 | 10/2007 | Prigge et al. | |
| 2007/0282470 A1 | 12/2007 | Hernandez et al. | |
| 2007/0282622 A1 | 12/2007 | Hernandez et al. | |
| 2007/0282644 A1 | 12/2007 | Diao et al. | |
| 2007/0282645 A1 | 12/2007 | Brown et al. | |
| 2007/0282653 A1 | 12/2007 | Bishop et al. | |
| 2007/0282655 A1 | 12/2007 | Jaluka et al. | |
| 2007/0282659 A1 | 12/2007 | Bailey et al. | |
| 2007/0282692 A1 | 12/2007 | Bishop et al. | |
| 2007/0282776 A1 | 12/2007 | Jaluka et al. | |
| 2007/0282876 A1 | 12/2007 | Diao et al. | |
| 2007/0288274 A1 | 12/2007 | Chao et al. | |
| 2007/0292833 A1 | 12/2007 | Brodie et al. | |
| 2008/0065448 A1 | 3/2008 | Hull et al. | |
| 2008/0109260 A1 | 5/2008 | Roof | |
| 2008/0213740 A1 | 9/2008 | Brodie et al. | |
| 2008/0215404 A1 | 9/2008 | Diao et al. | |
| 2009/0012887 A1 | 1/2009 | Taub et al. | |

OTHER PUBLICATIONS

BEA Systems, Inc., "BEA White Paper—BEA AquaLogic Service Bus—IT's Direct Route to SOA," printout from http://www.bea.com/content/news_events/white_papers/BEA_AQL_ServiceBus_wp.pdf, Jun. 2005.

Cape Clear Software, Inc., "Cape Clear 6.5", printout from http://www.capeclear.com/download/CC65_Broch.pdf, copyright notice 2005.

Cordys, "Cordys Enterprise Service Bus—Capabilities," printout from http://www.cordys.com/en/Products/Cordys_ESB_capabilities.htm, printed on Jun. 26, 2006.

Oracle, "Enterprise Service Bus," printout from http://www.oracle.com/appserver/esb.html, printed on Jun. 27, 2006.

(56) References Cited

OTHER PUBLICATIONS

PolarLake Limited, "Enterprise Service Bus (ESB) Resoure Center," printout from http://www.polarlake.com/en/html/resources/esb/, printed on Jun. 27, 2006, copyright notice dated 2006.
Sonic Software, "ESB Architecture & Lifecycle Definition," printout from http://www.sonicsoftware.com/products/sonic_esb/architecture_definition/index.ssp, printed on Jun. 26, 2006.
Mercury, Mercury Capacity Planning (Powered by Hyperformix), 2004.
Team Quest, Capacity Planning with TeamQuest Analytic Modeling Software, printed from http://www.teamquest.com/solutions-products/solutions/planning-provis . . . on Jun. 4, 2006.
"A Capacity Planning Model of Unreliable Multimedia Service Systems", by Kiejin Park and Sungsoo Kim, Department of Software, Anyang University, Kangwha, Incheon, South Korea, Jul. 2001.
"Tracking Your Changing Skills Inventory: Why Its Now Possible, and What It Means for Your Organization", from CIO.com, Mid 2002 IT Staffing Update, Brainbench.
"Project MEGAGRID: Capacity Planning for Large Commodity Clusters", An Oracle, Dell, EMC, Intel Joint White Paper, Dec. 2004.
Ganesarajah, Dinesh and Lupu Emil, 2002, Workflow-based composition of web-services: a business model or programming paradigm?, IEEE Computer Society.
M.D. Harrison, P.D. Johnson and P.C. Wright. "Relating the automation of functions in multi-agent control systems to a system engineering representation." Department of Computer Science, University of York, Heslington, York. UK. Aug. 13, 2004.
"Self-Adaptive SLA-Driven Capacity Management for Internet Services", by Bruno Abrahao et al., Computer Science Department, Federal University of Minas, Gerais, Brazil, 2005.

* cited by examiner

| | | | | | |
|---|---|---|---|---|---|
| By account | account1 ⌄ | | | | |
| By ticket number | | | | | |
| Set timerange | ◉ 24 hrs ○ 2d ○ 3d ○ 1w ○ 2w ○ 1m | | | | |
| ☐ only show my name in "Assigned to user" | | | ☐ only show open tickets | | |
| ↓ Go | | | | | |

Problem Tickets

| | | | | | | |
|---|---|---|---|---|---|---|
| ○ | Que1 | Pat Jones | 12/2/05 12:23:11 | 2 | 100012 - server cannot be connected at about for 3 hours | Open |
| ○ | Que2 | John Smith | 12/2/05 12:23:11 | 1 | 100013 - hardware failure | Open |
| ○ | Que1 | Pat Jones | 12/2/05 12:23:11 | 2 | 101018 - cannot connect to db | Open |
| ○ | Que1 | Pat Jones | 12/2/05 12:23:11 | 2 | 100018 - cannot connect to db | Open |
| ○ | Que1 | Pat Jones | 12/2/05 12:23:11 | 2 | 100213 - cannot connect to db | Open |
| ○ | Que1 | Pat Jones | 12/2/05 12:23:11 | 2 | 100233 - cannot connect to db | Open |
| ○ | Que1 | Pat Jones | 12/2/05 12:23:11 | 2 | 100221 - cannot connect to db | Open |
| ○ | Que1 | Pat Jones | 12/2/05 12:23:11 | 2 | 103233 - cannot connect to db | Open |
| ○ | Que2 | John Smith | 12/2/05 12:23:11 | 1 | 100002 - network failure | Open |
| ○ | Que1 | Pat Jones | 12/2/05 12:23:11 | 2 | 100019 - server is down | Open |
| ○ | Que2 | John Smith | 12/2/05 12:23:11 | 1 | 100023 - hardware failure | Open |

Showing nn-nnn of ppp   Page x of y [◄][▲][▼] Jump to page: [ ] ↻ Refresh

Last data loading at 11:23:21

→ Create new ticket

Sample Problem Management View

Figure 6

| | | | | |
|---|---|---|---|---|
| By account | account1 ▼ | | | |
| By ticket number | | | | |
| Set timerange | ● 24 hrs ○ 2d ○ 3d ○ 1w ○ 2w ○ 1m | | | |
| ☐ only show open tickets | | By keywords in title/description | | |
| ↓ Go | | | | |

Change Tickets

| | | | | |
|---|---|---|---|---|
| ○ | Que1 | 12/2/05 12:23:11 | 100012 - upgrade patches | Open |
| ○ | Que2 | 12/2/05 12:23:11 | 100013 - installed antivirus | Open |
| ○ | Que1 | 12/2/05 12:23:11 | 100018 - add another hd | Open |
| ○ | Que2 | 12/2/05 12:23:11 | 100002 - remove virus | Open |
| ○ | Que2 | 12/2/05 12:23:11 | 100034 - remove virus | Open |
| ○ | Que2 | 12/2/05 12:23:11 | 100023 - remove virus | Open |
| ○ | Que2 | 12/2/05 12:23:11 | 100044 - remove virus | Open |
| ○ | Que2 | 12/2/05 12:23:11 | 100004 - remove virus | Open |
| ○ | Que2 | 12/2/05 12:23:11 | 100045 - remove virus | Open |
| ○ | Que2 | 12/2/05 12:23:11 | 100345 - remove virus | Open |
| ○ | Que2 | 12/2/05 12:23:11 | 100045 - remove virus | Open |
| ○ | Que1 | 12/2/05 12:23:11 | 100019 - rewire | Open |
| ○ | Que2 | 12/2/05 12:23:11 | 100021 - re-install winxp | Open |

Showing nn-mm of pp ▼ Page x of y ▲▼ Jump to page: ☐ ↻ Refresh

Last data loading at 11:23:21

→ Create new ticket

Sample Change Management View

SYSTEM AND METHOD FOR DELIVERING AN INTEGRATED SERVER ADMINISTRATION PLATFORM

FIELD OF THE INVENTION

The present invention is generally related to the field of server administration tools and is more particularly related to the field of integrated server administration tools.

BACKGROUND

In the prior art, software developers utilize integrated development environments (IDEs) to develop and debug software. Prior to the current reliance on such IDEs, software developers needed to use separate and distinct tools for syntax checking their code, compiling, debugging, handling version control, and so forth. Modern software IDEs have the ability to merge all this functionality so that software developers don't see and aren't distracted by such separate and distinct tools.

One prior art IDE that is currently used by software developers is an open source platform know to those in the software arts as Eclipse, more information about which can be obtained from Eclipse Foundation, Inc. 102 Centrepointe Drive Ottawa, Ontario, Canada, K2G 6B1. Eclipse is an extension-rich platform that is based on the notion of plug-ins. Eclipse uses basic Java programmatic elements such as Package and Source File. Eclipse includes notions of perspectives and views. In Eclipse, different perspectives refer to different ways of looking at and working with the same underlying data. In Eclipse, views are windows focused on subsets of data within a given perspective.

The phrase "server administrator" (SA) refers generically to operating system-level administrators, database administrators, web administrators, network administrators, and the like. In the prior art, SAs have been limited by their use and interaction with underlying tools and processes, which have been based on little or no standardization and, as well, little or no integration. In order to perform their daily responsibilities, SAs often have had to create "glue code" to cobble together the outputs from one or more systems, services, tasks, tools, and processes with that of their own self-developed scripts. In the prior art, such "glue code" is typically created in a variety of languages and uses non standardized interfaces, "breaks" under the stress of enterprise usage, and as such is typically unsupported.

Figure 8:
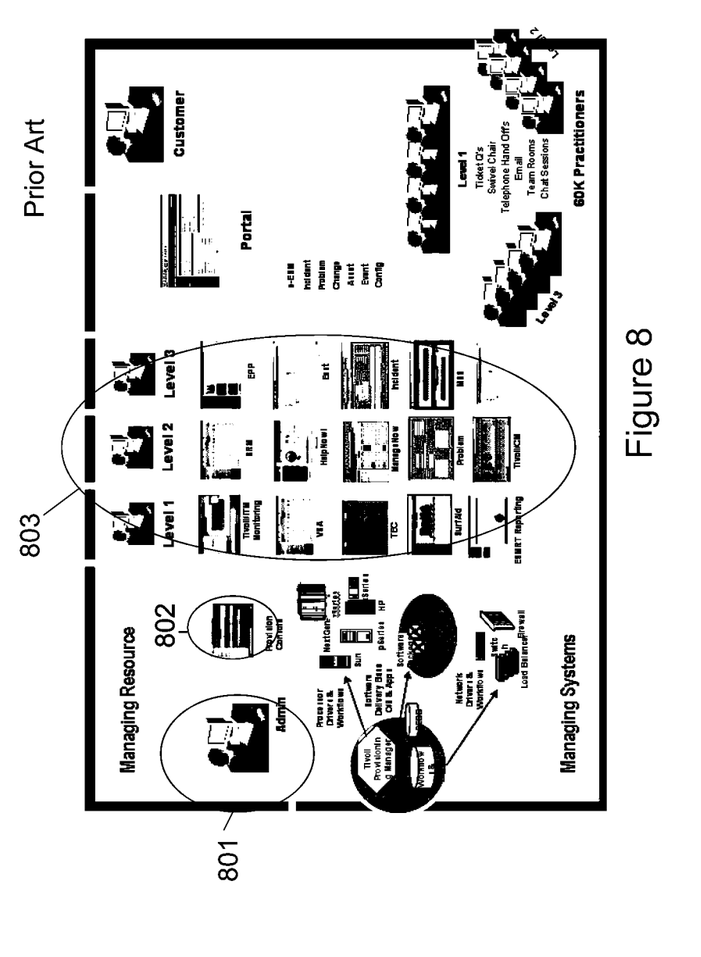
In FIG. 8 there is seen a representation of server administrator (SA) interacting with various tools, services, and/or processes via a prior art System Administrator Desktop.

Referring to FIG. 8, there is seen a representation of server administrator (SA) 801 interacting with various tools, services, and/or processes 803 via a prior art System Administrator Desktop 802. In such prior art systems, one sees a variety of non-interacting stand-alone tools and systems with little or no standardization amongst them. For example, in FIG. 8 one sees IT monitoring tools (Tivoli ITM, TEC), problem/change/ticketing tools/systems (ManageNow), reporting tools (SRM, ESMRT), search interfaces to knowledge repositories (HelpNow), patch management tools (VSA) and collaboration tools (telephone handoffs, email, team rooms and chat), some of which are known to those skilled in the art and some of which are proprietary applications.

Figure 9:
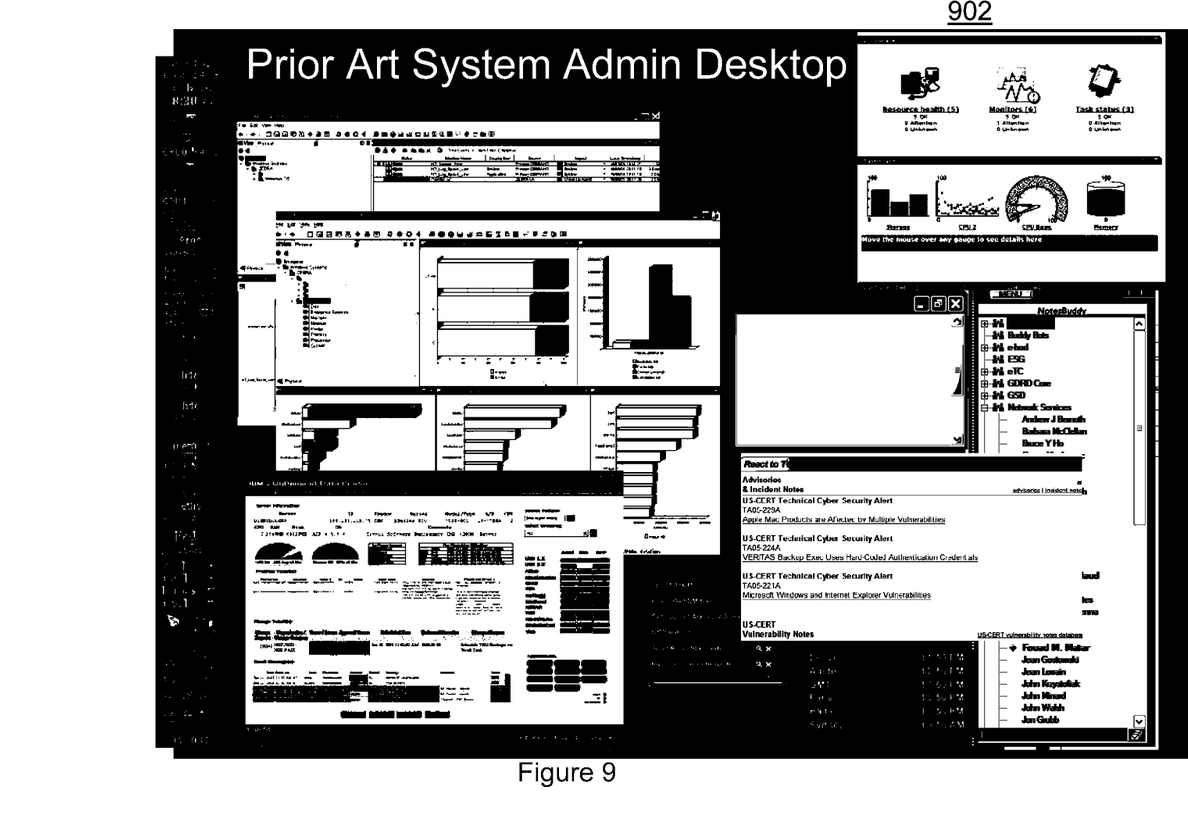
In FIG. 9 there is seen a view of a prior art Server Administrator Desktop.

Referring to FIG. 9, and FIG. 8 as needed, there is seen a view of a prior art Server Administrator Desktop 902. In the prior art, although views/perspectives are visible, they are not provided in a manner that enables communication of information between tools 803; which may, for example, cause the SA 801 to lose focus and access the wrong information at the wrong time. In the prior art, different perspectives on the same data are provided by different tools or applications that do not share a common data model. In the prior art Server Administrator Desktop 902 example shown, one sees a so-called dashboard that depicts system vitals (i.e. consumption of system resources), pressing problems, change records, bar charts of resource consumption, and various collaboration tools. In the prior art, none of the tools 803 communicate or are integrated in more than a superficial way.

It would therefore be desirable to provide SAs with systems and methods that provide them with improved access to tools, services, and processes.

SUMMARY

The present invention enables standardization of tools and provides improvements in service quality. Tools may be provided using one unambiguous authoritative data model, which eliminates data inconsistencies between sources. With the present invention, updates to service delivery clients may be delivered more quickly. The present invention also reduces costs for developing, deploying, and maintaining a tightly integrated service delivery client. Integration may be provided from the bottom up rather than after the fact. With the present invention, common base objects are provided for events, problem and change records, and other system administration artifacts. With the present invention, server administrators (SAs) are able to improve their productivity and performance. With the methods and systems described herein, searching for appropriate tools for appropriate tasks is minimized and/or eliminated. Easier scripting and automation that does not require implementation across tools is provided. As well, a consistent logical place is provided for all resources to be used.

In one embodiment, a computer implemented integrated administration environment (IAE) comprises one underlying resource model to enable server administrator interaction with a plurality of services. The interaction may be enabled via a common data model that comprises common base objects. The one underlying resource model may enable access to the functionality of a plurality of tools via one tool. Interaction with the one or more services may be enabled to occur in a perspective via the one tool. The perspective may comprise a resource management view, including one or more of a hierarchical view of physical or logical resources associated with servers, logical partitions (LPARs), and business processes. The perspective may comprise an information management view, including one or more of the following: problem management, change management, system vitals, systems based policy and profile, advisory, and/or server history views. The perspective may comprise a collaboration view to assist with one or more of the following: formal workflow, scheduling, teaming, and/or prioritizing. Services and tools may be capable of: sharing a common data and object models, acting upon the common data, and presenting information based on a common set of interaction paradigms. The resource management view may incorporate hierarchical views across multiple customer or in-house accounts. The information management view may deliver cross-server or cross-LPAR views for trouble-shooting, correlation, analysis, and visualization. The resource management view may provide a consistent logical place for access to all resources. The common base object may comprise one or more of the following: events, problem, and change events.

In one embodiment, a computer program product comprises a computer usable medium having computer usable program code that implements one underlying resource model to enable server administrator interaction with a plurality of services. The interaction is enabled via a common data model that comprises common base objects. The one underlying resource model enables server administrator interaction with the functionality of a plurality of tools via one tool.

In one embodiment, a service delivery system comprise a plurality of services residing on one or more computer, and an integrated administration environment (IAE) residing on another computer, wherein the IAE uses one underlying resource model to enable a server administrator to interact with the plurality of services. The interaction is enabled via a common data model that comprises common base objects. The one underlying resource model enables server administrator interaction with the functionality of a plurality of tools via one tool.

In one embodiment, a method of administering one or more server comprise steps of providing an integrated administration environment (IAE); providing a plurality of services; and interacting with all the plurality of services via the IAE using one tool. In one embodiment, the interaction is enabled via a common data model that comprises common base objects.

Other embodiments, objects, advantages and benefits will become apparent upon a reading of the following figures, description, and claims.

DESCRIPTION

In the following discussion, the terms "certain embodiments", "an embodiment", "embodiment", "embodiments", "the embodiment", "the embodiments", "one or more embodiments", "some embodiments", "one embodiment", and other variants thereof, mean one or more (but not all) embodiments unless expressly specified otherwise. The terms "including", "comprising", "having" and variants thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Figure 1:
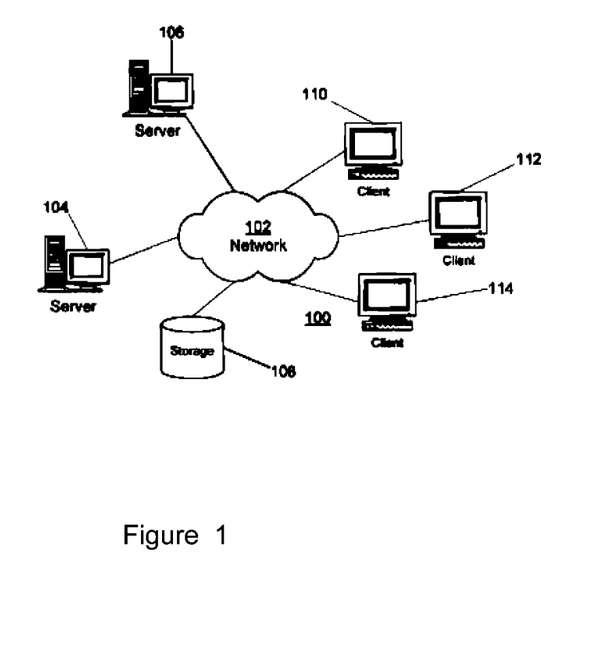
In FIG. 1 there is seen a representation of a system comprising a network, wherein one or more clients are operatively coupled to communicate with one or more servers and one or more storage devices.

Referring now to FIG. 1, there is seen a representation of a system 100 comprising a network 102, wherein one or more clients 110, 112, 114 are operatively coupled to communicate with one or more servers 104, 106, and one or more storage devices 108, as could be implemented by those skilled in the art. Client/server may describe a relationship between two computers/programs in which one computer/program, the client, makes a request for service to another computer/program, the server, which fulfills the request. Although the client/server idea can be used by programs within a single computer, it is applicable to a network of computers as well. In a network, the client/server model provides a convenient and efficient way to implement and interconnect needed hardware, firmware, and software that may distributed across different locations. One or more embodiments discussed can be deployed within system 100, as could be implemented by those skilled in the art.

Embodiments discussed herein provide server administrators (SAs) with an integrated administration client that masks the presence of its underlying tools. An integrated administration client beneficially enables SAs to focus their attention on core responsibilities such as problem and change management, server configuration, and inspection of the current state of servers. In one embodiment, a common data and object model is used by an administration client and by all underlying tools. The resources may be modeled to define various aspects of server configuration, along with base event, problem and change objects. Along with a common data and object model, an integrated administration client may declare a set of interaction paradigms that are shared by all underlying tooling so that an SA can have a seamless experience and so the SA will not be distracted by the presence of disparate tools with independent user experiences/interaction models. In one embodiment, underlying tools are linked to one or more perspectives and/or views via a plug-in architecture such that underlying tooling is indistinguishable from that of other underlying platform services.

Figure 2:
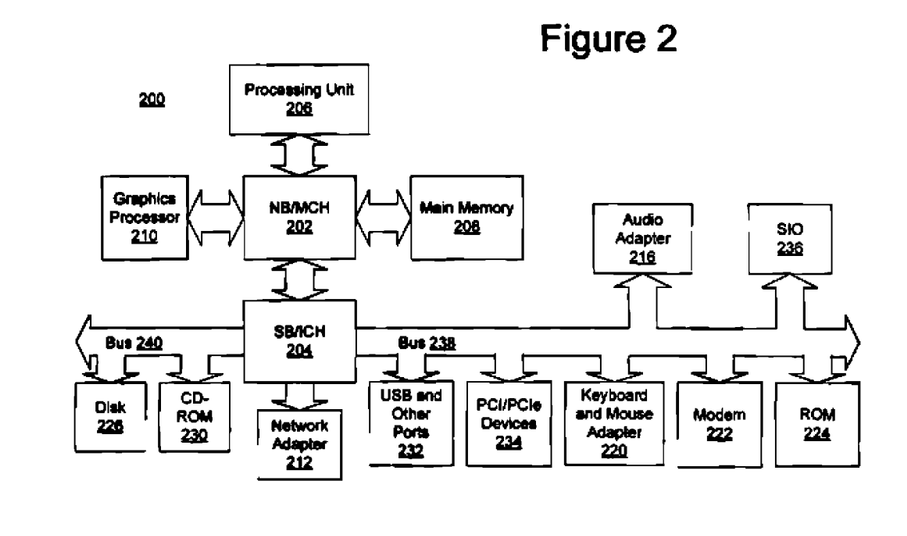
In FIG. 2 there is seen a representation of possible embodiments of a client, a server, storage and/or other devices(s), with which embodiments of the present invention may be implemented.

Referring now to FIG. 2, and other Figures as needed, there is seen a representation of possible embodiments of a client, a server, storage and/or other devices(s), with which embodiments of the present invention may be implemented. In embodiments, a client, a server, storage and/or other devices (s) may comprise one or more of the following: a processor 206, a memory 208 (e.g., a volatile memory device), storage devices 226, 230, 224, and other circuits, as are known and able to be implemented by those skilled in the art. In one embodiment, storage devices may be embodied as a non-volatile memory device, magnetic disk drive, optical disk drive, tape drive, etc. Storage may as well comprise an internal storage device, an attached storage device and/or a network accessible storage device. Other possible components know to those skilled are represented and may be implemented as needed by those skilled in the art.

Figure 3:
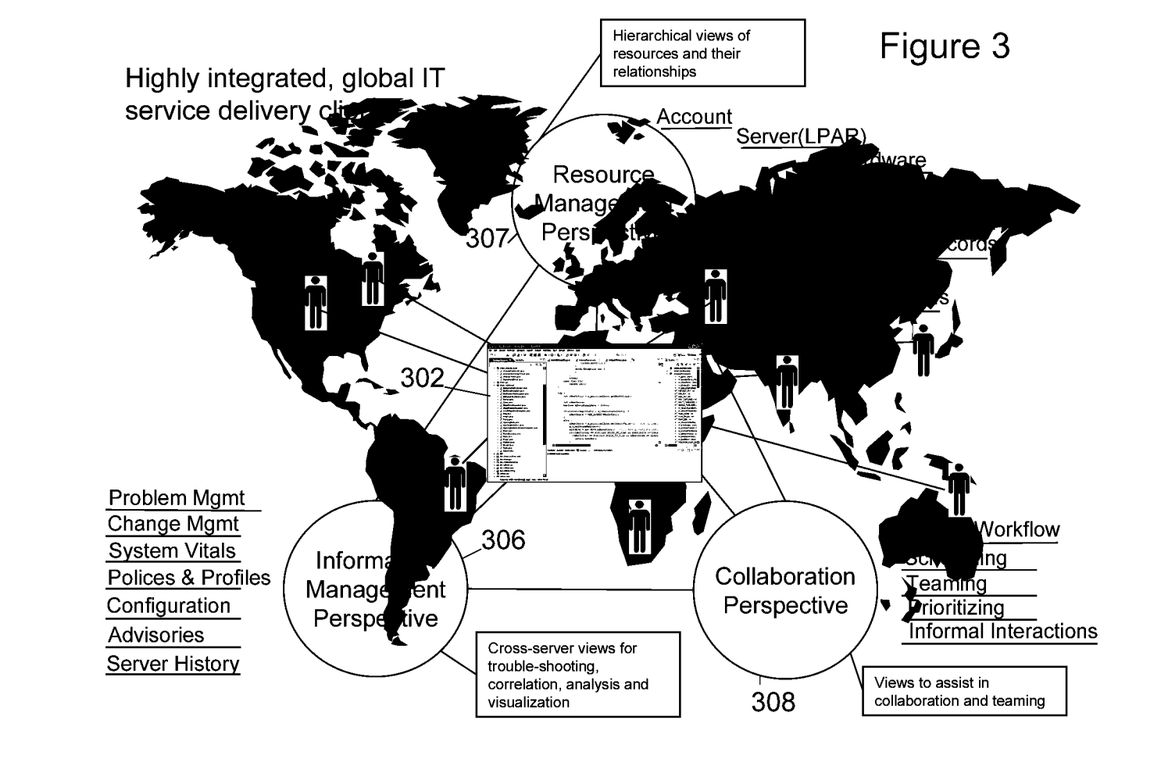
In FIG. 3 there is seen a non-inclusive representation of different services and system resources that may be handled via an Integrated Administrative Desktop.

Referring to FIG. 3, and other Figures as needed, there is seen a non-inclusive representation of different services and system resources that may be handled via an Integrated Administrative Desktop 302. In embodiments, SAs can access system resources via a Resource Management Perspective 307, an Information Management Perspective 306, and a Collaboration Perspective 308.

In embodiments, system resources associated with servers that can be accessed by SAs include, but are not limited to: NICs, hard drives, CPUs, RAM, logical or physical sever partitions, processes, applications; and any other system resources residing on a server that can be accessed by a user or automated system monitor. As well, deployment topologies, performance and state information, and policies can be accessed. In other embodiments, SAs may access other task oriented information from various process perspectives, including problem management and change management perspectives, as well as others.

Figure 4:
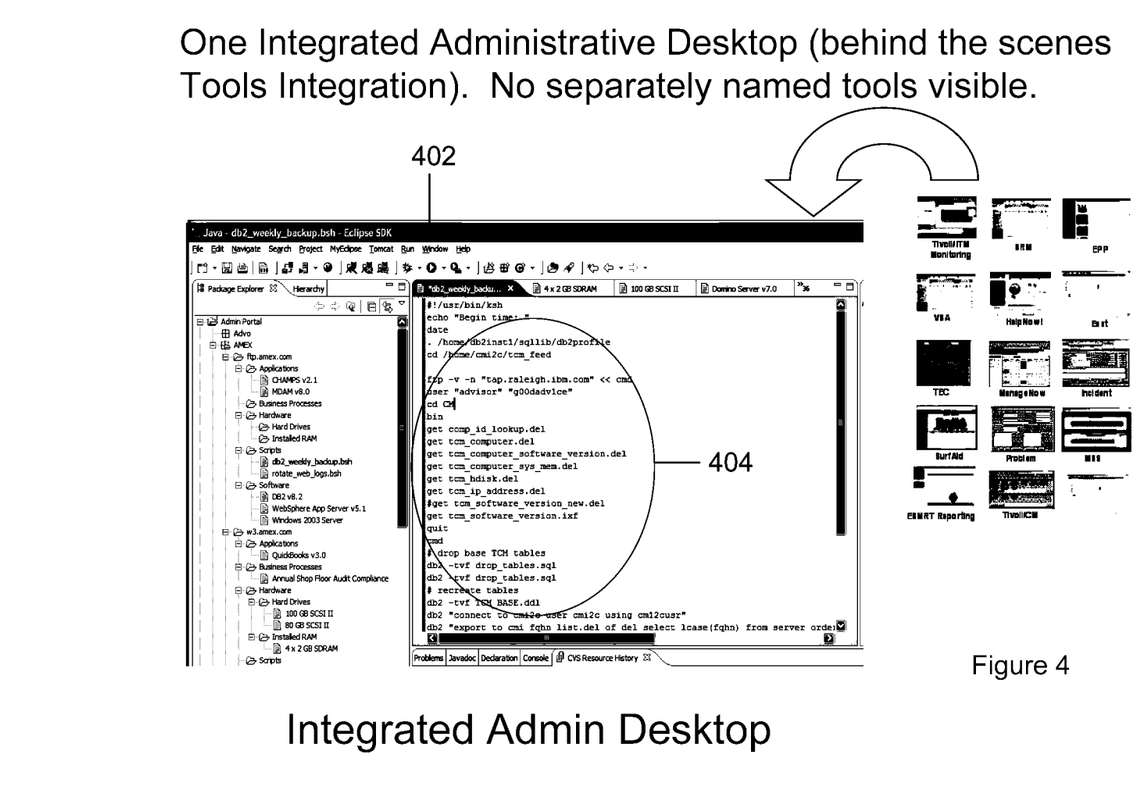
In FIG. 4 there is seen an Integrated Administrative Desktop.

Referring to FIG. 4, and other Figures as needed, there is seen an Integrated Administrative Desktop 402 of the present invention. In the preferred embodiment, SAs interact with the Desktop 402, which enables the functionality of multiple prior art tools to be integrated as one tool that uses an underlying resource model. Different SA tasks invoke different perspectives or views on the underlying resource model. For example, individual tasks, whose functionality was managed in the prior art by SAs that were forced to use separate individual tools 803, now are now capable of being managed by using one integrated application deployed as a single Integrated Administrative Desktop 402.

Figure 5:
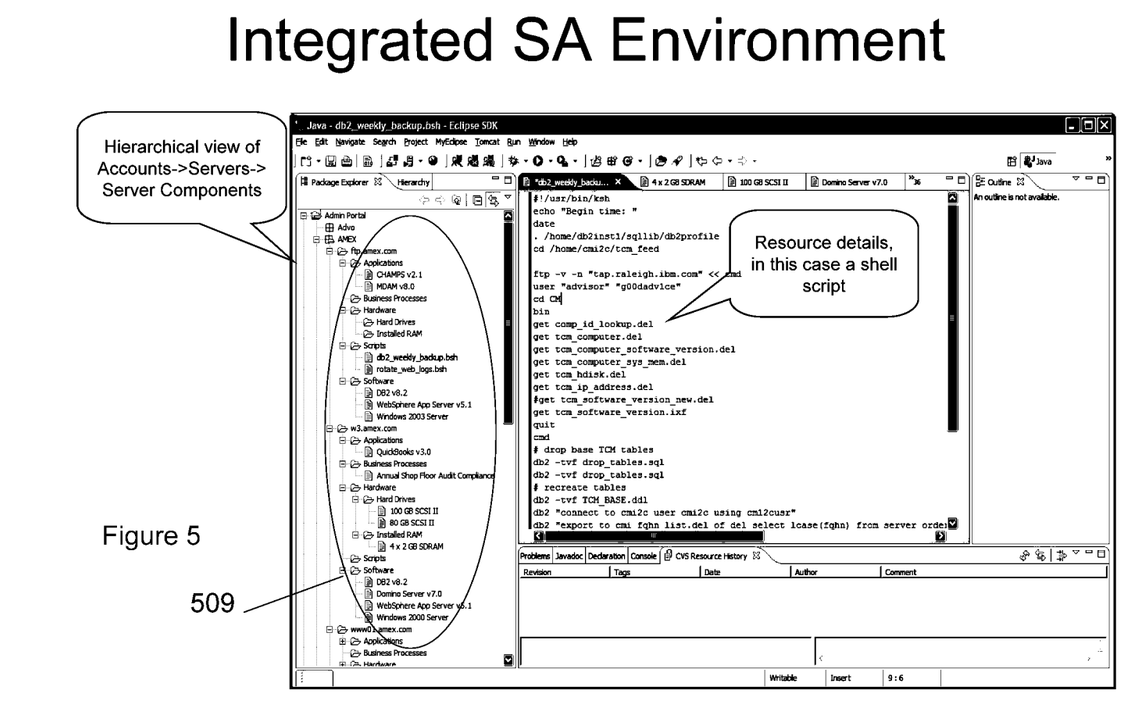
In FIG. 5 there is illustrated how SA interactions with servers may occur in one perspective in a hierarchical Account>Server>Server Components drill down format.

Referring to FIG. 5, and other Figures as needed, in one embodiment, there is illustrated how SA interactions with servers may occur in one perspective in a hierarchical Account>Server>Server Components drill down format 509. In one perspective, for example, a problem management perspective, an SA may view problem records across all accessible servers, with problem records ranked according to severity, and automatically correlated with change records. In one embodiment, for example, from a system vitals perspective, an SA may view CPU utilization, RAM usage, etc., not just for one server at a time, but across all accessible servers. In one embodiment, critical servers could be listed first.

In one embodiment, business processes and applications on given servers may be graphically decomposed. Components associated with a server, such as logs, problem records, change records, scripts, etc. may be logically stored. Right clicking on the logs, or on another component may allow one to see the physical location of the components. By storing common components in a standard logical location, SAs may be able to navigate around any server. Base objects may be defined for problem records, change records, events, and so forth. All problem management systems may have record objects that are derived from a base problem record object and, similarly, for change records and event records. In one embodiment, a base object may be the industry standard Common Base Event (CBE), as is known to those skilled in the art.

In a preferred embodiment, the present invention may be implemented as a set of plugins to the aforementioned Eclipse platform, with three perspectives as depicted in FIG. 3, one for resource management 307, another for knowledge or information management 306, and a third for collaboration or the management of collaborations in the context of the servers that one is administering 308. Within each perspective there may be a number of views which represent data in meaningful and consistent manner.

The Resource Management Perspective 307 may comprise a hierarchical depiction of resources that mimics the Java Package>Source File (or Project->Java Package->Source File) resource hierarchy available natively in Eclipse or other IDEs to Java software developers. In the case of server system administration, and in the case where system administrators administer to multiple accounts, account would take the place at the top of the hierarchy, and underneath each account one would see the servers or logical partitions of servers (LPARs), business processes and other entities under administrative purview at the highest level. Underneath server or LPAR one would see the associated hardware, software, problem and change records, and other items associated with a server (policies, advisories, alerts, etc.) while underneath business process one would see applications and perhaps lower level business processes. The hierarchy would continue, for example allowing the SA to drill down to specific hardware and software components to see any detail required, such as the specifications of a particular piece of hardware and any current state information that could be gleaned from the system, and analogously for software items. A software item may be anything from installed shrink-wrapped software to running home-grown applications with many dependencies and components.

Figure 6:
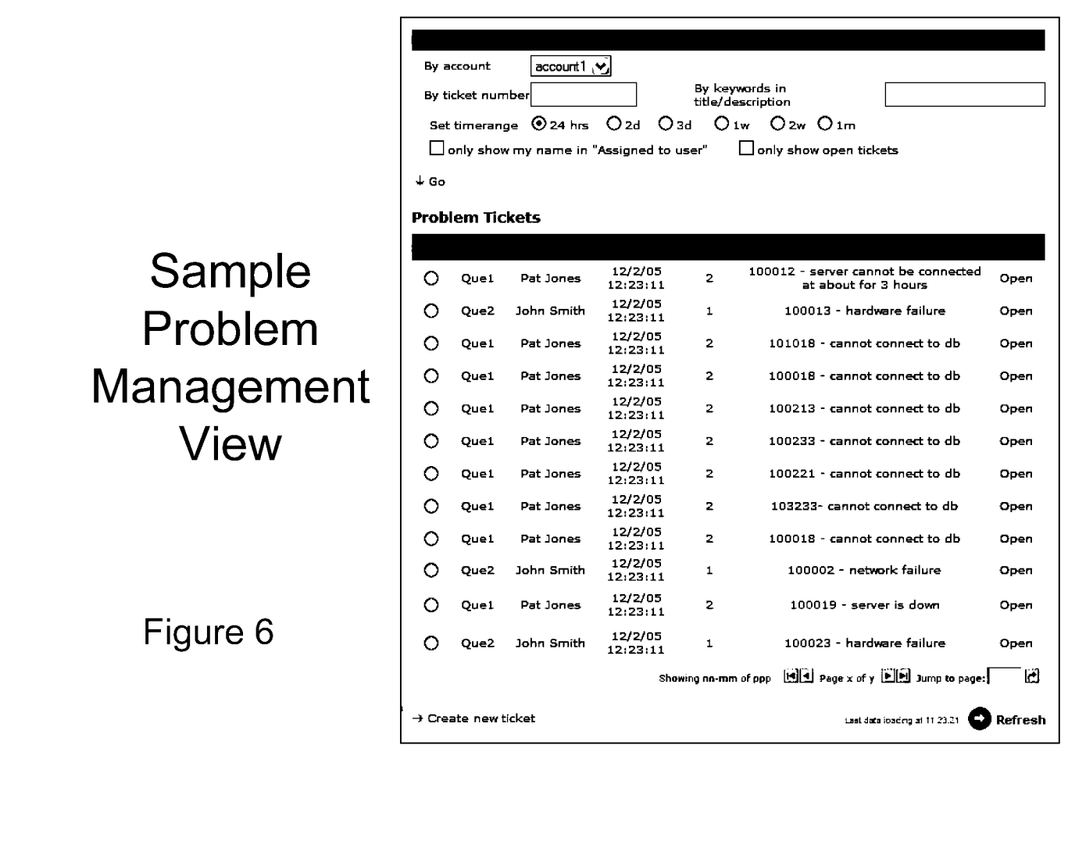
In FIGS. 6 and 7 examples of Problem and Change Management views for one account at a time are represented.
Figure 7:
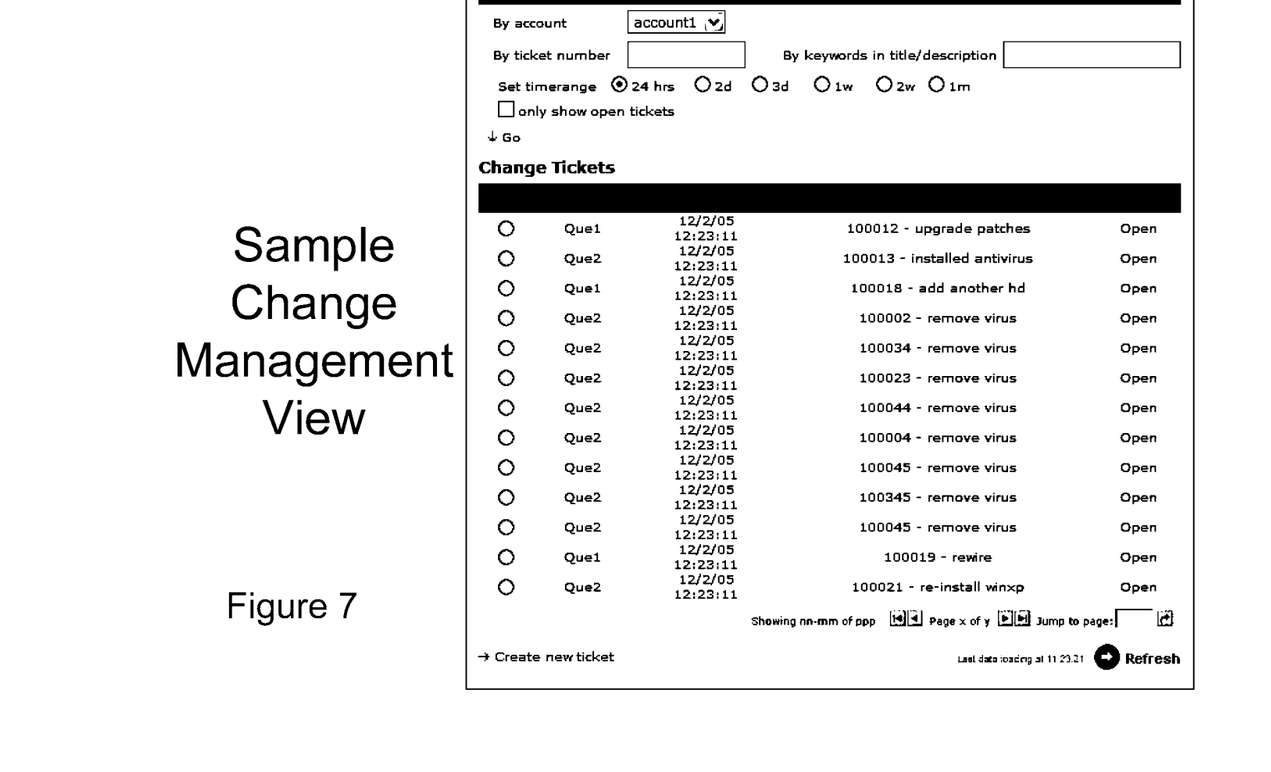

In a next perspective, an Information Management Perspective 306 offers alternative ways of viewing resources other than the hierarchical view available from the Resource Management perspective. The Problem and Change Management views offer views across all problem and change records of concern to the SA—pointing him/her to the most pressing issues. FIGS. 6 and 7 give examples of Problem and Change Management views for one account at a time, but it is also possible to have views across accounts. The idea of the views in this perspective are that they are views of data that cut across resources and resource boundaries to help the SA understand what is going on globally with his servers and what the pressing issues are. In one embodiment, there may be a System Vitals view that enables one to compare servers based on their consumption of system resources, like RAM and CPU consumption. As illustrated, there may also be views to compare policies and profiles, server configuration data, advisories (also known as proactive alerts) and historical server information.

In another perspective, a Collaboration Perspective 308 may provide a view depicting formal workflow such as a list of To Do items. Such To Do items would generally include formally choreographed workflow items (i.e. items which flow through the hands of more than one actor) and not the informal To Dos of a single SA. An example of an item appearing on such a To Do list is a change record requiring approval or ultimate action. Note that one can ultimately drill down to a Change Record (or any of a number of other resources) from any of the three perspectives and numerous views. There may be other views supporting collaboration as well, such as those for scheduling, teaming, prioritization and also to support informal interactions. Because a given SA does not typically work 24 by 7, it may be important for SAs to keep track of their own schedules as well as that of their colleagues. Some collaborative views overlap these areas, for example the To Do list described above falls both in the area of formal work flow and prioritization.

In the preferred embodiment, a common data model is accessed by all tooling (surfaced through perspectives and views). The common data model supports the entities and relations discussed above via use of tables. The data model may contain entities (database tables) that represent one or more of the following:
   1. Accounts
   2. Servers (LPARs)
   3. Account servers
   4. Business processes
   5. Applications
   6. Hardware associated with a server (LPAR)
   7. Software associated with a server (LPAR)
   8. Base problem record information
   9. Base change record information
   10. Base event information
   11. Server vitals history
   12. Advisory conditions (conditions which, if present on a server, evoke actual alerts or "server advisories.")
   13. Server advisories
   14. Server support teams 15. Server schedule
16. Server security policies amongst others. Note that some of these tables may actually contain embedded relation information. For example, the table representing Account servers tells what servers go with what accounts, and effectively joins the Account and Server tables. The same is true for the Server advisory table and others.

In one embodiment, on top of the data model sits a light weight object model written in Java and shared by all contributing perspectives and views. Of importance are the objects for base problem and change events, and the base event object, which may be patterned after the industry standard common base event (CBE). In one embodiment, wherein a system utilizes problem and change management systems provided by several vendors (for example, IBM, Peregrine and Remedy), the base problem and change objects may be "common denominator" objects and each of the actual systems involved may extend the base objects and data mappings through tables in unique ways. In this way, clients that are interested in getting an overall view of problem and change records, without regard to system specific information, can access all problem and change records using the base object types, and clients interested in getting system specific information can also do so using derived types.

One or more of the embodiments described herein may be implemented as a method, apparatus or article of manufacture involving software, firmware, micro-code, hardware and/or combinations thereof. One or more of the embodiments described herein may be implemented and deployed within systems and components as previously represented in FIGS. 1 and 2, as well as other systems that could be implemented by those skilled in the art. Certain embodiments of the present invention reside on and may be implemented in a processor, a memory, storage, circuit, hardware, firmware, software, etc. In one embodiment, the present invention may be deployed as computing instructions by a person or automated processing integrating computer-readable code into a computing system, wherein the code in combination with the computing system is enabled to perform the operations of the described embodiments. Certain ones of the operations described herein may be performed in parallel as well as sequentially. In alternative embodiments, certain of the operations may be performed in a different order, modified or removed. Furthermore, some of the elements have been described separately for purposes of illustration. Such components may be integrated into a fewer number of components or divided into a larger number of components. Additionally, certain operations described as performed by a specific component may be performed by other components.

The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that an article of manufacture may comprise any information bearing medium. For example, an article of manufacture may comprise a storage medium having stored therein instructions that when executed by a machine results in operations being performed.

Certain embodiments may take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Elements of the invention that are in communication with each other need not be in continuous communication with each other, unless expressly specified otherwise. In addition, devices that are in communication with each other may communicate directly or indirectly through one or more intermediaries. Additionally, a description of an embodiment with several elements in communication with each other does not necessarily imply that all such components are required. On the contrary a variety of optional elements are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A computer implemented integrated administration environment (IAE), wherein the IAE comprises:
one underlying resource model to enable server administrator interaction with a plurality of services and access to functionality of a plurality of tools via one tool, wherein the interaction with the services is enabled to occur in at least one perspective via the one tool,
the perspective comprising an information management perspective illustrating data across multiple resources residing on servers, wherein the information management perspective delivers cross-server and cross-logical partition (cross-LPAR) views for trouble-shooting, correlation, analysis, and visualization, the servers connected to a non-transitory storage device, the information management perspective including:
a problem management view showing problem records across the servers, and
a system vitals view showing consumption of system resources across the servers.

2. The IAE of claim 1, wherein the interaction is enabled via a common data model comprising common base objects, the common base objects including events, problem, and change events.

3. The IAE of claim 1, wherein the perspective further comprises a resource management perspective including
a hierarchical view of physical resources and logical resources associated with the servers,
logical partitions (LPARs), and
business processes.

4. The IAE of claim 3, wherein the resource management perspective incorporates hierarchical views across multiple customer or in-house accounts.

5. The IAE of claim 3, wherein the resource management perspective provides a consistent logical place for access to all resources.

6. The IAE of claim 3, wherein the resource management perspective further includes, underneath the LPARs, associated hardware, associated software, problem records, change records, server policies, server advisories.

7. The IAE of claim 1, wherein the information management perspective further includes:
a change management view showing change records across the servers,
a systems based policy and profile view showing policies and profiles across the servers,
an advisory view showing advisory conditions evoking alerts across the servers, and
a server history view showing historical information across the servers.

8. The IAE of claim 1, wherein the perspective further comprises a collaboration view to assist with formal workflow, scheduling, teaming, and prioritizing.

9. The IAE of claim 1, wherein the services and tools are capable of:
sharing common data and object models,
acting upon the common data, and
presenting information based on a common set of interaction paradigms.

10. A computer program product, comprising:
a non-transitory computer usable medium having computer usable program code implementing one underlying resource model to enable server administrator interaction with a plurality of services and access to functionality of a plurality of tools via one tool, wherein the interaction with the services is enabled to occur in at least one perspective via the one tool,
the perspective comprising an information management perspective illustrating data across multiple resources residing on servers, the information management perspective including a problem management view showing problem records across the servers, wherein the information management perspective delivers cross-server and cross logical partition (cross-LPAR) views for trouble-shooting, correlation, analysis, and visualization.

11. The computer program product of claim 10, wherein the interaction is enabled via a common data model comprising common base objects, the common base objects including events, problem, and change events.

12. The computer program product of claim 10, wherein the perspective further comprises:
a resource management perspective including:
a hierarchical view of physical resources and logical resources associated with the servers,
logical partitions (LPARs), and
business processes; and
a collaboration view to assist with formal workflow, scheduling, teaming, and prioritizing,
wherein the information management perspective further includes:
a change management view showing change records across the servers,
a systems based policy and profile view showing policies and profiles across the servers,
an advisory view showing advisory conditions that evoking alerts across the servers, and
a server history view showing historical information across the servers.

13. A service delivery system, comprising:
a plurality of services residing on one or more computer, and
an integrated administration environment (IAE) residing on another computer, wherein the IAE uses one underlying resource model to enable a server administrator to interact with the plurality of services and access to functionality of a plurality of tools via one tool, wherein the interaction with the services is enabled to occur in at least one perspective via the one tool,
the perspective comprising an information management perspective illustrating data across multiple resources residing on servers, the servers connected to a non-transitory storage device, the information management perspective including a problem management view showing problem records across the servers, wherein the information management perspective delivers cross-server and cross logical partition (cross-LPAR) views for trouble-shooting, correlation, analysis, and visualization.

14. The system of claim 13, wherein the interaction is enabled via a common data model comprising common base objects, the common base objects including events, problem, and change events.

15. The system of claim 13, wherein the perspective further comprises:
a resource management perspective including:
a hierarchical view of physical resources and logical resources associated with the servers,
logical partitions (LPARs), and
business processes; and
a collaboration view to assist with formal workflow, scheduling, teaming, and prioritizing,
wherein the information management perspective further includes:

a change management view showing change records across the servers, a systems based policy and profile view showing policies and profiles across the servers, an advisory view showing advisory conditions that evoking alerts across the servers, and a server history view showing historical information across the servers.

16. A method of administering one or more server, comprising the steps of:

providing an integrated administration environment (IAE) comprising one underlying resource model;

providing a plurality of services; and interacting with all the plurality of services via the underlying resource model of the IAE using one tool, said interaction with the services is enabled to occur in at least one perspective via the one tool, the perspective comprising an information management perspective illustrating data across multiple resources residing on servers, the information management perspective including a problem management view showing problem records across the servers, wherein the information management perspective delivers cross-server and cross logical partition (cross-LPAR) views for trouble-shooting, correlation, analysis, and visualization.

17. The method of claim 16, wherein the interaction is enabled via a common data model that comprises common base objects, the common base objects including events, problem, and change events.

18. The method of claim 16, wherein the perspective further comprises:

a resource management perspective including:

a hierarchical view of physical resources and logical resources associated with the servers, logical partitions (LPARs), and business processes; and a collaboration view to assist with formal workflow, scheduling, teaming, and prioritizing, wherein the information management perspective further includes:

a change management view showing change records across the servers, a systems based policy and profile view showing policies and profiles across the servers, an advisory view showing advisory conditions that evoking alerts across the servers, and a server history view showing historical information across the servers.

* * * * *